United States Patent
Oh et al.

(10) Patent No.: US 12,424,097 B2
(45) Date of Patent: Sep. 23, 2025

(54) SYSTEM AND METHOD FOR GENERATING PARKING AVAILABILITY INFORMATION

(71) Applicant: ELECTRONICS AND TELECOMMUNICATIONS RESEARCH INSTITUTE, Daejeon (KR)

(72) Inventors: Cheonin Oh, Daejeon (KR); Daesub Yoon, Daejeon (KR); Sung Woong Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 78 days.

(21) Appl. No.: 18/537,985

(22) Filed: Dec. 13, 2023

(65) Prior Publication Data

US 2024/0331541 A1    Oct. 3, 2024

(30) Foreign Application Priority Data

Mar. 27, 2023  (KR) .................. 10-2023-0039730
May 17, 2023   (KR) .................. 10-2023-0063665

(51) Int. Cl.
| | | |
|---|---|---|
| *G08G 1/14* | (2006.01) | |
| *G06V 10/25* | (2022.01) | |
| *G06V 10/74* | (2022.01) | |
| *G06V 10/75* | (2022.01) | |
| *G06V 20/52* | (2022.01) | |

(52) U.S. Cl.
CPC ............ *G08G 1/146* (2013.01); *G06V 10/25* (2022.01); *G06V 10/751* (2022.01); *G06V 10/761* (2022.01); *G06V 20/52* (2022.01); *G08G 1/143* (2013.01); *G06V 2201/08* (2022.01)

(58) Field of Classification Search
None
See application file for complete search history.

(56) References Cited

U.S. PATENT DOCUMENTS

| | | | |
|---|---|---|---|
| 9,076,060 B2 | 7/2015 | Song et al. | |
| 10,025,997 B2 | 7/2018 | Han et al. | |
| 10,796,434 B1* | 10/2020 | Kim | ................. B60R 11/04 |
| 2017/0032583 A1* | 2/2017 | Moran | ................. G08G 1/065 |
| 2018/0301031 A1* | 10/2018 | Naamani | ............ G01C 21/3685 |
| 2018/0319327 A1* | 11/2018 | Cunningham, III | ... B60Q 5/006 |
| 2019/0102634 A1* | 4/2019 | Sagami | ................. G06V 20/593 |
| 2019/0375397 A1* | 12/2019 | Bae | ................. B60W 30/06 |
| 2020/0117926 A1* | 4/2020 | Kim | ................. G08G 1/143 |
| 2020/0207334 A1* | 7/2020 | Cho | ................. G08G 1/168 |
| 2020/0327808 A1* | 10/2020 | Takemura | ............ G08G 1/0175 |

(Continued)

FOREIGN PATENT DOCUMENTS

| | | |
|---|---|---|
| KR | 20180078984 A | 7/2018 |
| KR | 20180128030 A | 11/2018 |

(Continued)

*Primary Examiner* — Fekadeselassie Girma
(74) *Attorney, Agent, or Firm* — Rabin & Berdo, P.C.

(57) ABSTRACT

A method of generating parking availability information according to the present invention includes detecting at least one already parked vehicle from an image captured by a camera; converting object area information corresponding to the detected parked vehicle into real distance information; and generating parking availability information of a parking target vehicle based on the real distance information.

10 Claims, 14 Drawing Sheets

(56) References Cited

U.S. PATENT DOCUMENTS

2021/0331666 A1*  10/2021  Meng ..................... G08G 1/146
2023/0030600 A1*   2/2023  Shi ........................ G08G 1/148

FOREIGN PATENT DOCUMENTS

| KR | 101998052 B1 | 7/2019 | | |
| KR | 102223572 B1 | 3/2021 | | |
| KR | 102323552 B1 | 11/2021 | | |
| KR | 20220112947 A | * 8/2022 | .............. | G06T 7/70 |
| KR | 1020220112947 A | 8/2022 | | |
| KR | 102494860 B1 | * 2/2023 | ............. | G08G 1/141 |

* cited by examiner

CAMERA IMAGE

MAP IMAGE

SYSTEM AND METHOD FOR GENERATING PARKING AVAILABILITY INFORMATION

CROSS-REFERENCE TO RELATED APPLICATION

This application claims priority to and the benefit of Korean Patent Application No. 10-2023-0039730, filed on Mar. 27, 2023 and Korean Patent Application No. 10-2023-0063665, filed on May the disclosure of which is incorporated herein by reference in its entirety.

BACKGROUND

1. Field

The present invention relates to a system and method for generating parking availability information.

2. Description of Related Art

A smart parking system is intended to automate and optimize provision of various types of information in existing parking lots, and is used to detect locations of parked vehicles and whether vehicles can be parked, and to collect, provide, and manage information for this purpose.

This smart parking system may utilize sensors such as infrared ray, geomagnetism, and laser or images captured by cameras to check the entry and exit of a vehicle, or monitor whether vehicles can be parked in real time and calculate the number of parking availability vehicles only in cases where there is a parking line or an area in which a parking surface is divided has been fixed in advance.

However, the conventional smart parking system can make accurate determination only when the parking line or the parking surface area is predefined, but has a problem in that it is difficult to accurately determine whether a vehicle is parked when a sensor error occurs or the parking line or the parking surface is not divided or when a vehicle is parked while ignoring the parking line or parking surface.

SUMMARY

The present invention provides a system and method for generating parking availability information capable of generating parking availability information regardless of the presence or absence of a parking division line.

However, the problems to be solved by the present invention are not limited to the problems described above, and other problems may be present.

According to a first aspect of the present invention, a method of generating parking availability information performed by a computer according to the present invention includes detecting at least one already parked vehicle from an image captured by a camera; converting object area information corresponding to the detected parked vehicle into real distance information; and generating parking availability information of a parking target vehicle based on the real distance information. In this case, in the generating of the parking availability information of the parking target vehicle, parking availability information that includes occupancy information of parked vehicles and a parking availability section based on a distance between the parked vehicles may be generated from the real distance information set for a predetermined reference line.

According to a second aspect of the present invention, a system for generating parking availability information includes: a vehicle object detection unit that detects at least one already parked vehicle from an image captured by a camera; a real distance information conversion unit that converts object area information corresponding to the detected parked vehicle into real distance information; and a parking availability information generation unit that generates parking availability information including occupancy information of the parked vehicles and a parking availability section based on a distance between the parked vehicles from the real distance information set for a predetermined reference line.

According to a second aspect of the present invention, a system for generating parking availability information includes a communication unit that transmits and receives data to and from an external server where vehicle specification information is stored and a vehicle, and receives an image captured by the camera; a memory that stores a program for generating parking availability information for a parking target vehicle from the image; and a processor that executes the program stored in the memory to detect at least one already parked vehicle is detected from the image, convert object area information corresponding to the detected parked vehicle into real distance information, generate the parking availability information including occupancy information of parked vehicles and a parking availability section based on a distance between the parked vehicles from the real distance information set for a predetermined reference line, and then provide the parking availability information to the parking target vehicle through the communication module.

A computer program according to another aspect of the present invention for solving the above problems is combined with a computer as hardware to execute a method of generating parking availability information and is stored in a computer-readable recording medium.

Other specific details of the invention are included in the detailed description and drawings.

DETAILED DESCRIPTION

Figure 1:
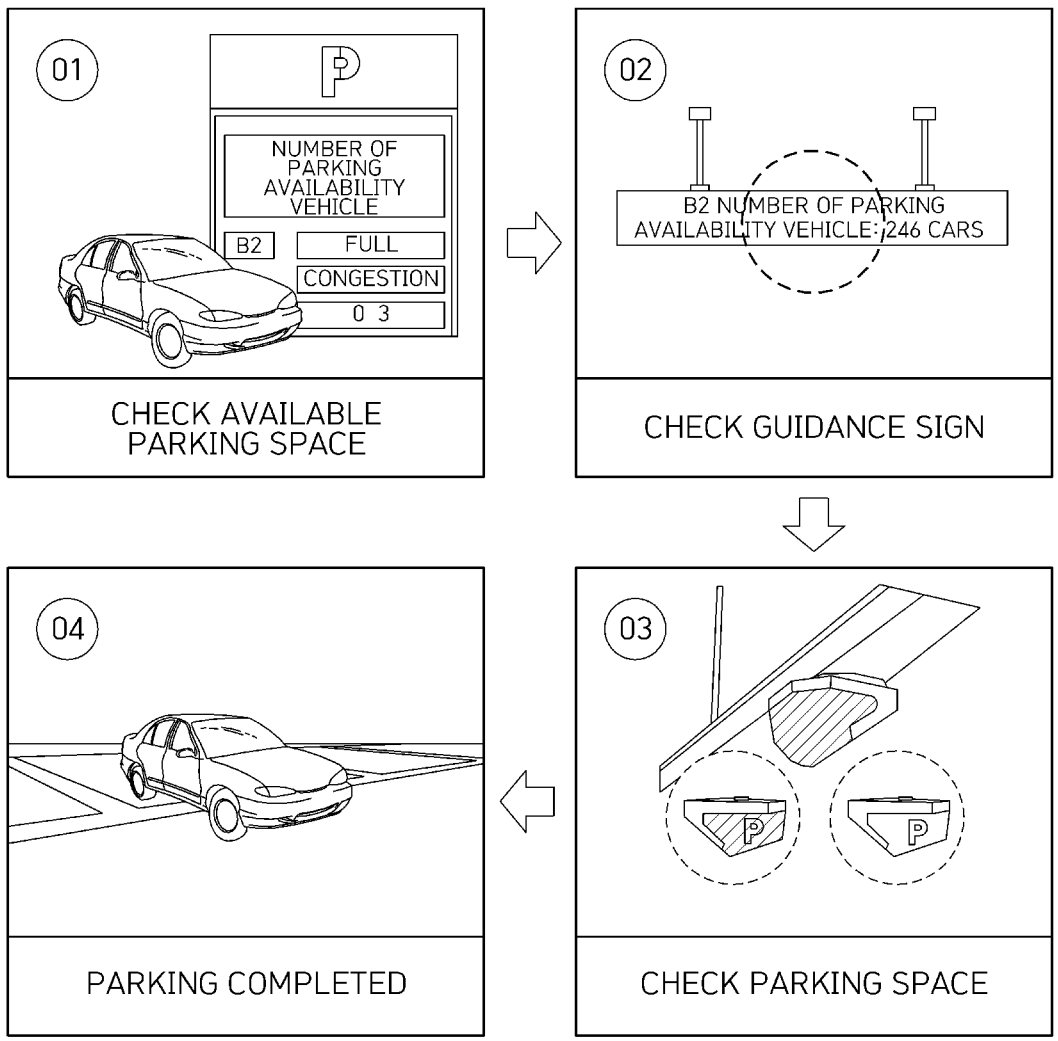
FIG. 1 is a diagram for describing provision of parking availability information using an ultrasonic sensor.

Various advantages and features of the present invention and methods accomplishing them will become apparent from the following description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. Throughout this specification, the term "comprise" and/or "comprising" will be understood to imply the inclusion of stated constituents but not the exclusion of any other constituents. Like reference numerals refer to like components throughout the specification and "and/or" includes each of the components mentioned and includes all combinations thereof. Although "first," "second," and the like are used to describe various components, it goes without saying that these components are not limited by these terms. These terms are used only to distinguish one component from other components. Therefore, it goes without saying that the first component mentioned below may be the second component within the technical scope of the present invention.

Unless defined otherwise, all terms (including technical and scientific terms) used in the present specification have the same meanings commonly understood by those skilled in the art to which the present invention pertains. In addition, terms defined in commonly used dictionary are not ideally or excessively interpreted unless explicitly defined otherwise.

Hereinafter, the background to which the present invention was conceived will be described to help those skilled in the art understand, and then the present invention will be described in detail.

The currently installed smart parking system may determine whether a vehicle can be parked only when there is a parking line or a parking surface area is preset as fixed, and can calculate the number of parking availability vehicles based on the determination. The smart parking system may provide various types of information using sensing information from sensors such as infrared ray, geomagnetism, and laser, or images captured by cameras.

For example, sensors may be installed on each parking surface to detect whether a vehicle is located on the corresponding parking surface, and the detected information may be transmitted to a central parking control system to compile a parking status. In the early days, wired communication networks were used to transmit information, resulting in excessive costs for infrastructure construction or the like. However, recently wireless networks have become the dominant form, making it possible to reduce costs. Nevertheless, a sensor-based method has the problem in that sensors should be installed on each parking surface and a lot of money is required for maintenance issues in the event of a breakdown.

FIG. 1 is a diagram for describing provision of parking availability information using an ultrasonic sensor.

In the case of a parking control system 110 using an ultrasonic sensor among the sensor-based methods, a parking determination speed is very fast within about 0.5 seconds. However, in the case of the ultrasonic sensor method, there is a problem that the parking surface should be divided in advance and one ultrasonic sensor should be installed on each parking surface.

In addition, in the ultrasonic sensor method, the installation location of the ultrasonic sensor is important, and false detection may occur when a vehicle invades a parking line or a two-wheeled vehicle is parked, and a failure rate of the ultrasonic sensor itself is not low, so inaccurate parking availability information may be often provided.

Figure 2A:
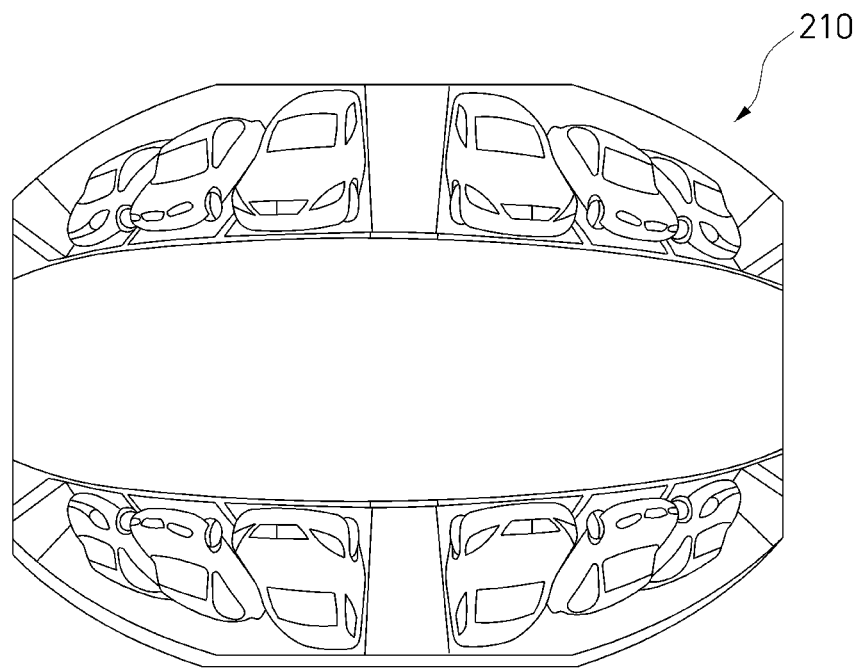
FIGS. 2A and 2B are diagrams for describing provision of parking availability information in a camera-based manner.
Figure 2B:
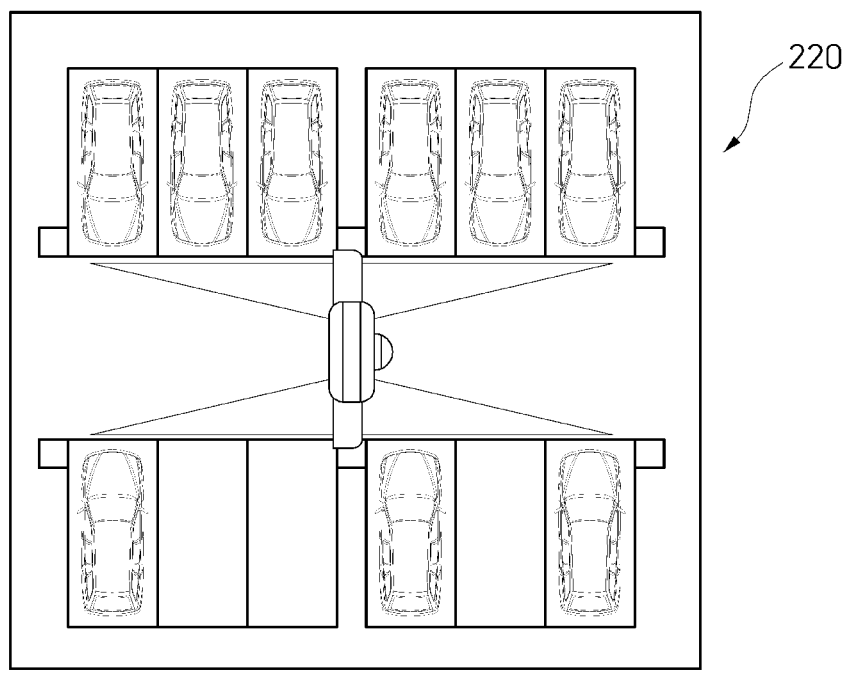

FIGS. 2A and 2B are diagrams for describing provision of parking availability information in a camera-based manner.

In order to solve various problems of the existing sensor-based parking control system, technologies are also emerging to determine the parking status of multiple parking surfaces with a single 360° camera.

Depending on the type of cameras, detection of 6, 8, or 12 surfaces is possible. FIGS. 2A and 2B illustrate determining whether a vehicle is parked on a total of 12 front and rear parking surfaces through the 360° camera (210, 220).

However, like the sensor-based method, in the case of a camera-based method, the parking space should be divided in advance. That is, usually after the camera is installed, division information for the parking surface should be defined in advance by manually drawing a virtual line on the image or recognizing the division line of the parking surface.

In the case of the camera-based method, the time required to determine whether a vehicle is parked is approximately 1 to 3 seconds, which is slightly longer than the sensor-based method, but is sufficient time for service. In addition, since multiple parking surfaces may be managed with one camera, there are advantages in terms of construction cost and maintenance. However, in the case of on-street parallel parking lots, the number of parking spaces that may be managed per camera may be somewhat limited.

However, the technology for providing parking availability information using the sensor-based or camera-based method described above has a limitation in that it can be applied only when the parking division is defined in advance. In addition, for vehicles that are parked in places without separate parking lines or are parked while ignoring the parking division line, it is often difficult to determine whether a vehicle is parked or parking recognition errors may occur.

In order to solve this problem, the system and method for generating parking availability information according to an embodiment of the present invention recognizes parking occupancy areas without a separate parking division definition procedure even when there are no parking lines, and may generate and provide occupancy information (the number of parking spaces and the number of parking availability vehicles) and parking availability section (parking availability area) of parked vehicles to managers and users (or vehicles) based on the recognized parking occupancy.

Meanwhile, according to an embodiment of the present invention, the parking availability information may be generated even in situations where there is no parking surface or parking partition line, but the case where there is a parking partition line or parking surface is not excluded. In other words, the actual occupancy level and the parking availability space of the vehicle and may be detected with only minimal proactive survey working on a parking zone. In addition, in the description of the present invention, a situation in which parallel parking or perpendicular parking is necessary will be described as an example, but other parking types (such as diagonal parking) are not excluded.

Hereinafter, embodiments of the present invention will be described in detail with reference to the attached drawings.

Figure 3:
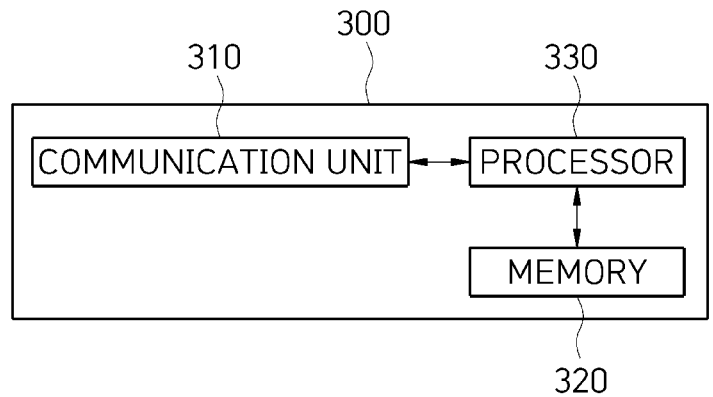
FIG. 3 is a block diagram of a system for generating parking availability information according to an embodiment of the present invention.

FIG. 3 is a block diagram of a system 300 for generating parking availability information according to an embodiment of the present invention.

A system 300 for generating parking availability information according to an embodiment of the present invention includes a communication unit 310, a memory 320, and a processor 330.

The communication unit 310 performs communication with internal components of the system 300 for generating parking availability information, or a user terminal, a vehicle communication terminal, and an external server in which vehicle specifications information is stored, and the like. The communication unit 310 may include both a wired communication module and a wireless communication module. The wired communication module may be implemented as a power line communication device, a telephone line communication device, cable home (MoCA), Ethernet, IEEE1294, an integrated wired home network, and an RS-485 control device. In addition, the wireless communication module may be configured in a module for implementing functions such as wireless LAN (WLAN), Bluetooth, HDR WPAN, UWB, ZigBee, Impulse Radio, 60 GHZ WPAN, Binary-CDMA, wireless USB technology and wireless HDMI technology, 5th (5G) generation communication, long term evolution-advanced (LTE-A), long term evolution (LTE), and wireless fidelity (Wi-Fi)

The memory 320 stores a program for generating parking availability information for a parking target vehicle, a manager server, etc., from an image captured by a camera. Here, the memory 320 collectively refers to a non-volatile storage device that continuously maintains stored information even when power is not supplied and a volatile storage device. For example, the memory 320 may include NAND flash memories such as a compact flash (CF) card, a secure digital (SD) card, a memory stick, a solid-state drive (SSD), and a micro SD card, magnetic computer storage devices such as a hard disk drive (HDD), and optical disc drives such as CD-ROM and DVD-ROM.

The processor 330 may execute software such as a program to control at least one other component (e.g., hardware or software component) of the system 300 for generating parking availability information, and may perform various data processing or calculations. The processor 330 may use a certain trained artificial intelligence algorithm to generate parking availability information.

Figure 4:
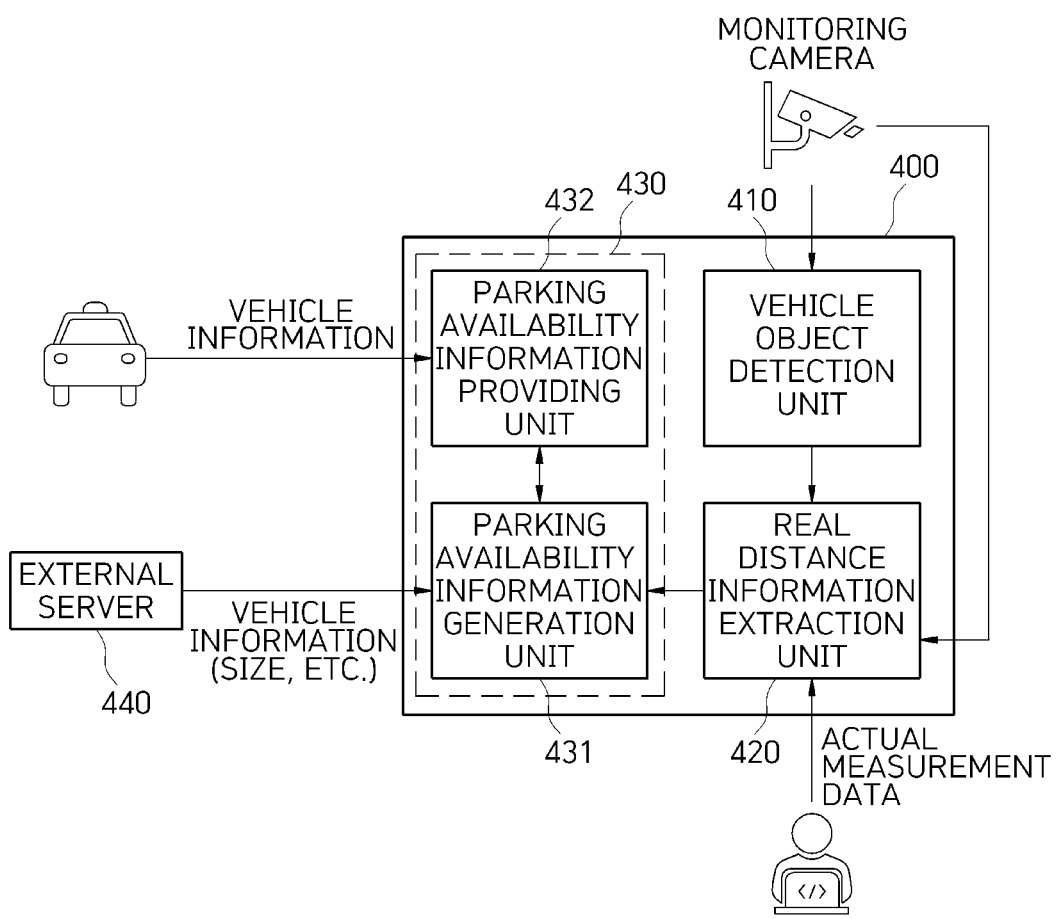
FIG. 4 is a functional block diagram of a system for generating parking availability information according to an embodiment of the present invention.

FIG. 4 is a functional block diagram of a system 400 for generating parking availability information according to an embodiment of the present invention.

The system 400 for generating parking availability information according to an embodiment of the present invention may include a vehicle object detection unit 410, a real distance information extraction unit 420, and a parking availability information management unit 430.

The vehicle object detection unit 410 detects at least one already parked vehicle from an image captured by a camera. The vehicle object detection unit 410 may provide information on the detected parked vehicle as coordinate information (hereinafter referred to as object area information) based on a predetermined image coordinate system.

The real distance information extraction unit 420 converts object area information corresponding to the detected parked vehicle into real distance information. To this end, the real distance information extraction unit 420 according to an embodiment of the present invention may convert image coordinates of object area information into real distance information using the initially collected actual measurement data and length conversion parameters.

First, the process of acquiring actual measurement data will be described below.

In order to use the image captured by the camera, a distance from a reference point in the field should be actually measured. As an example, assuming that there is no parking division line or is ambiguous, the actual measurement data may be acquired by using a structure near both end points of the parking availability section or directly installing or marking a marker and then measuring the length between the corresponding points. In this case, in the case of the related art, the actual measurement of a large number of points was required, but an embodiment of the present invention has the advantage of being able to proceed with very simplified proactive working since it requires only two points.

Figure 5:
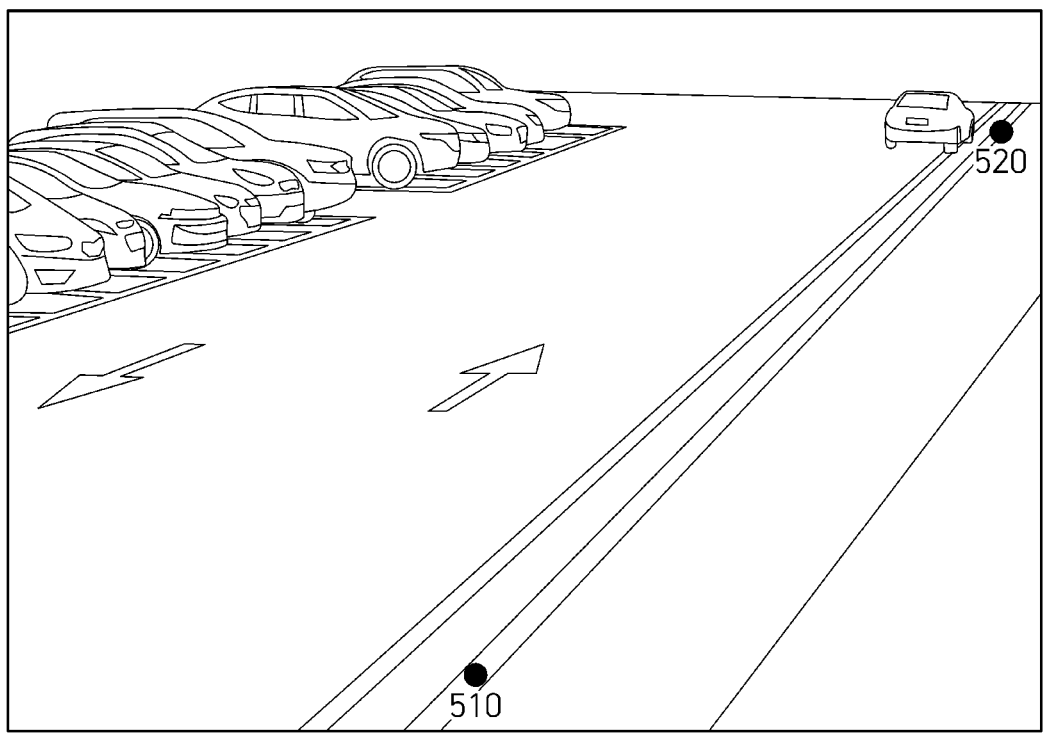
FIG. 5 is a diagram illustrating an example of setting a field reference point to obtain actual measurement data.

FIG. 5 is a diagram illustrating an example of setting a field reference point to obtain actual measurement data.

For example, as illustrated in FIG. 5, the real distance may be measured by setting, as each point 510 and 520, a road edge zone line and both ends of a curb, which may be used as reference lines when parking. In this case, a point marker should be identifiable to determine the location of the corresponding pixel in the image so that it may be used when extracting length conversion parameters. When it is a curve, it is possible to measure the distance between points by adding at least one point in the middle and then perform the same processing.

Figure 6:
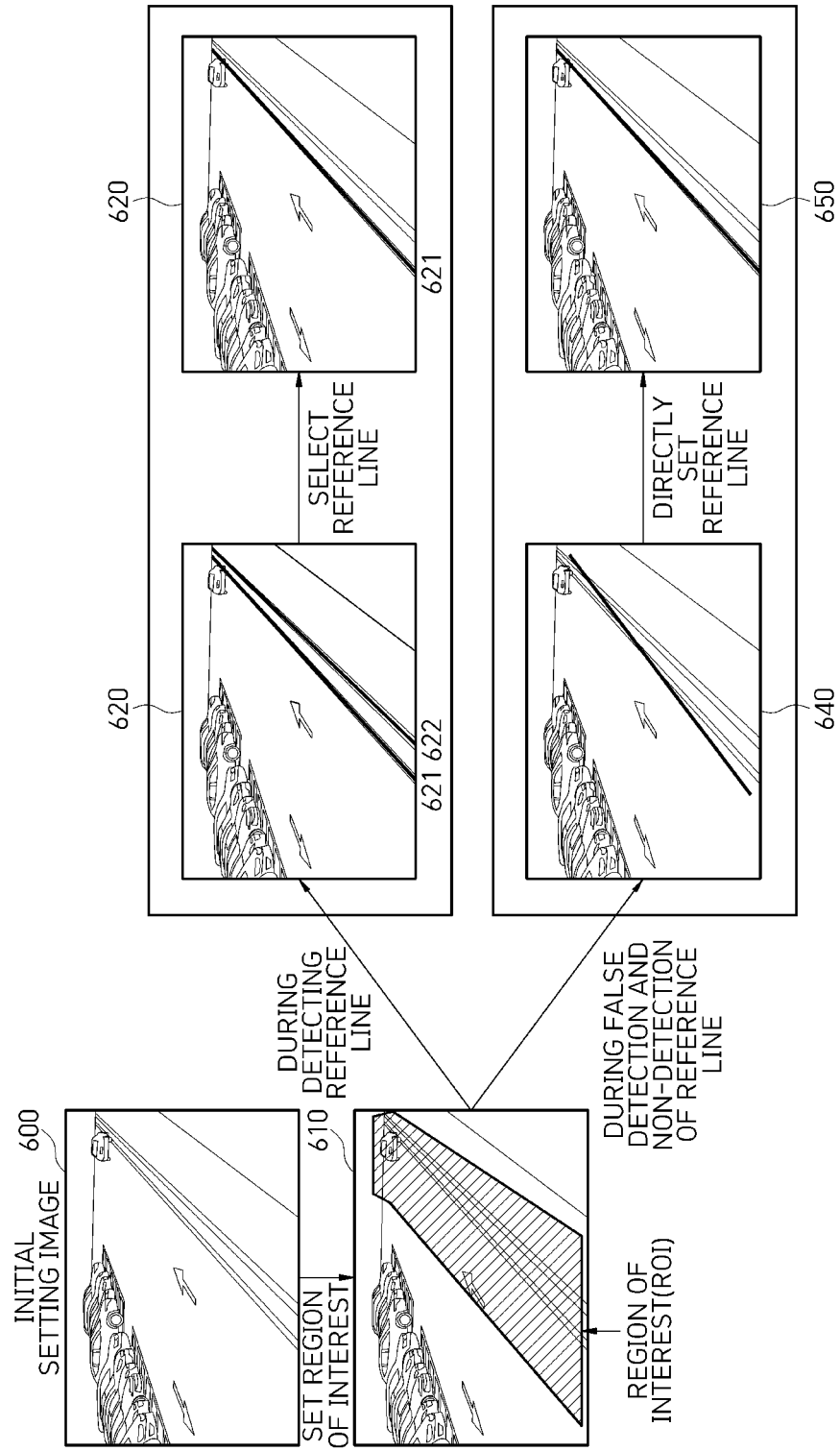
FIG. 6 is a diagram for describing an example of setting a reference line in an embodiment of the present invention.

FIG. 6 is a diagram for describing an example of setting a reference line in an embodiment of the present invention.

First, the real distance information extraction unit 420 may set a region of interest for a parking lot from an initial setting image 600 (610). Next, at least one candidate reference line may be extracted within the region of interest (620). In this case, the real distance information extraction unit 420 may extract a straight or curved reference line using the existing algorithm. Next, when the real distance information extraction unit 420 receives a selection input for one of a plurality of candidate reference lines from a user, it may apply the selected candidate reference line as a reference line (630). Unlike the selection input, a user may also directly set and define a reference line on the image. In this case, when the real distance extraction information unit 420 incorrectly detects or does not detect the candidate reference line (640), the user may directly set the reference line (650).

Figure 7A:
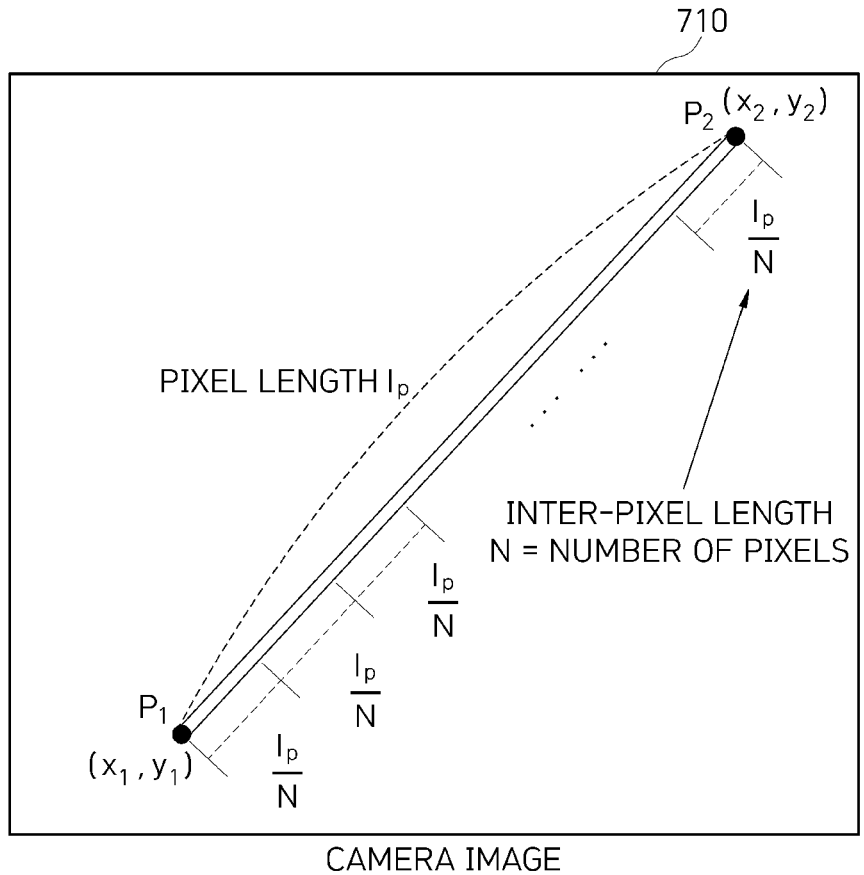
FIGS. 7A and 7B are diagrams for describing a process of calculating and extracting length conversion parameters in an embodiment of the present invention.
Figure 7B:
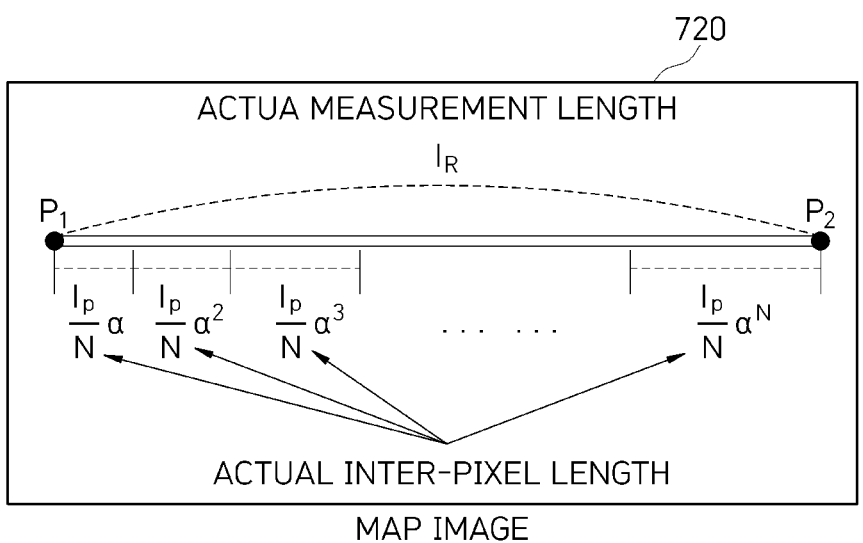

FIGS. 7A and 7B are diagrams for describing a process of calculating and extracting length conversion parameters in an embodiment of the present invention.

When the reference line setting is completed, the length conversion parameters necessary to convert an inter-pixel distance between major points of parked vehicles detected in future images into a real distance are calculated. In a camera image 710, the actual inter-pixel distance increases toward the rear, and the length conversion parameter, which is a proportional parameter value for this, is defined as $\alpha$. As in the camera image 710 of FIG. 7A, when there are two points $P_1$ and $P_2$ and the number of pixels between the two points is N, the inter-pixel Euclidean distance is constant as $$\frac{l_p}{N}.$$

However, the actual measured length on the map image 720 increases proportionally by the ratio from $P_1$ to $P_2$. The length conversion parameter $\alpha$ may be calculated based on the actual length between points initially measured and this proportional increase relationship.

The number N of pixels can be taken as a larger value from pixel coordinates on the horizontal and vertical axes, as shown in Equation 1.

$$N = \begin{cases} |x_2 - x_1|, & |x_2 - x_1| \geq |y_2 - y_1| \\ |y_2 - y_1|, & |x_2 - x_1| < |y_2 - y_1| \end{cases} \quad \text{[Equation 1]}$$

The Euclidean distance between the two points $P_1$ and $P_2$ is $l_p = \sqrt{(x_2-x_1)^2 + (y_2-y_1)^2}$, and due to the nature of the actual distance increasing from P1 to P2, the length conversion parameter $\alpha$ has a value greater than 1. Therefore, the actual distance $l_R$ between $P_1$ and $P_2$ may be defined as Equation 2 according to the series algorithm, and the length conversion parameter value $\alpha$ may be obtained from this.

$$l_R = \frac{l_p}{N} \alpha \left( \frac{\alpha^N - 1}{\alpha - 1} \right), \quad |\alpha| \geq 1 \quad \text{[Equation 2]}$$

Figure 8A:
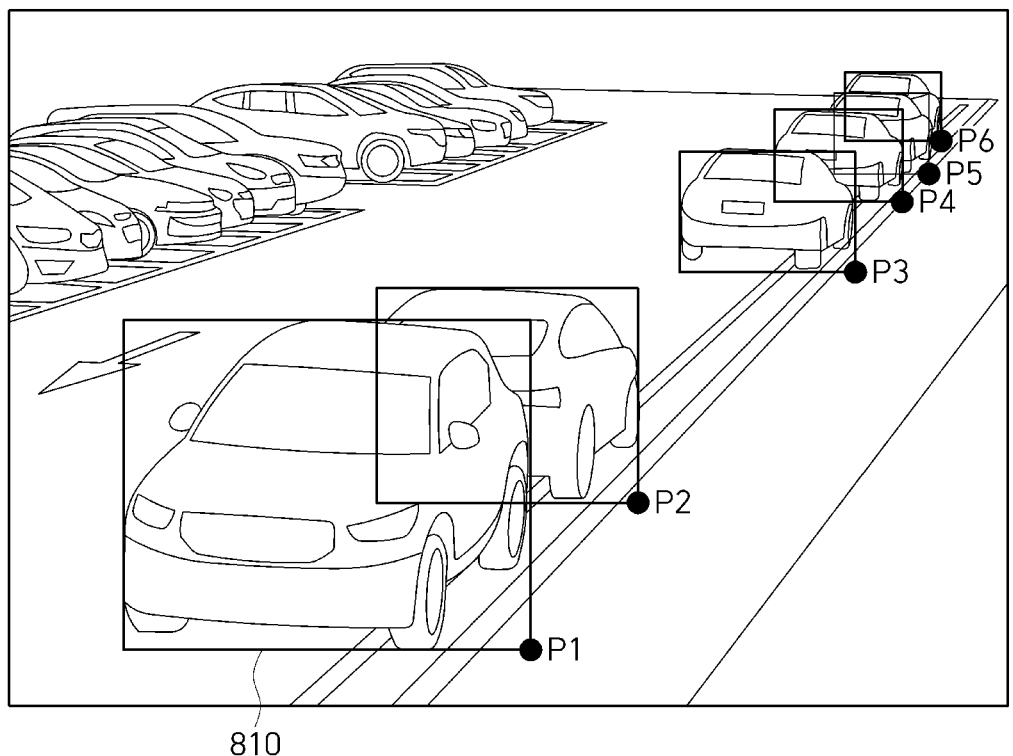
FIG. 8A is a diagram illustrating a parked vehicle detected in an image during parallel parking.
Figure 8B:
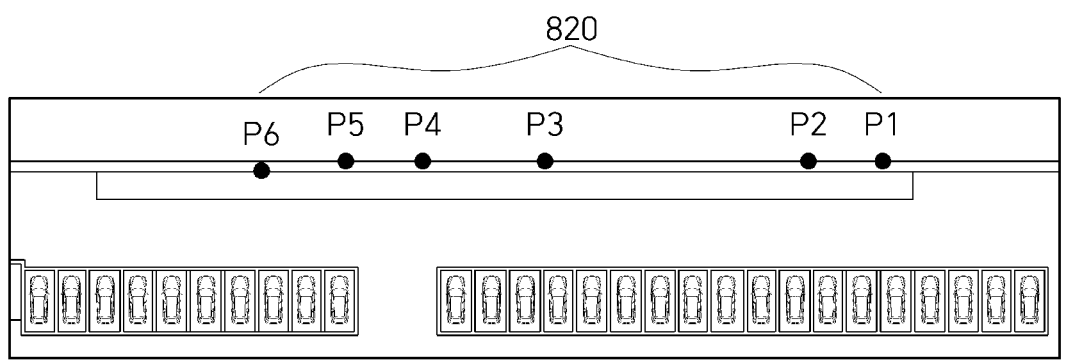
FIG. 8B is a diagram illustrating FIG. 8A as an actual location point on a map.
Figure 9:
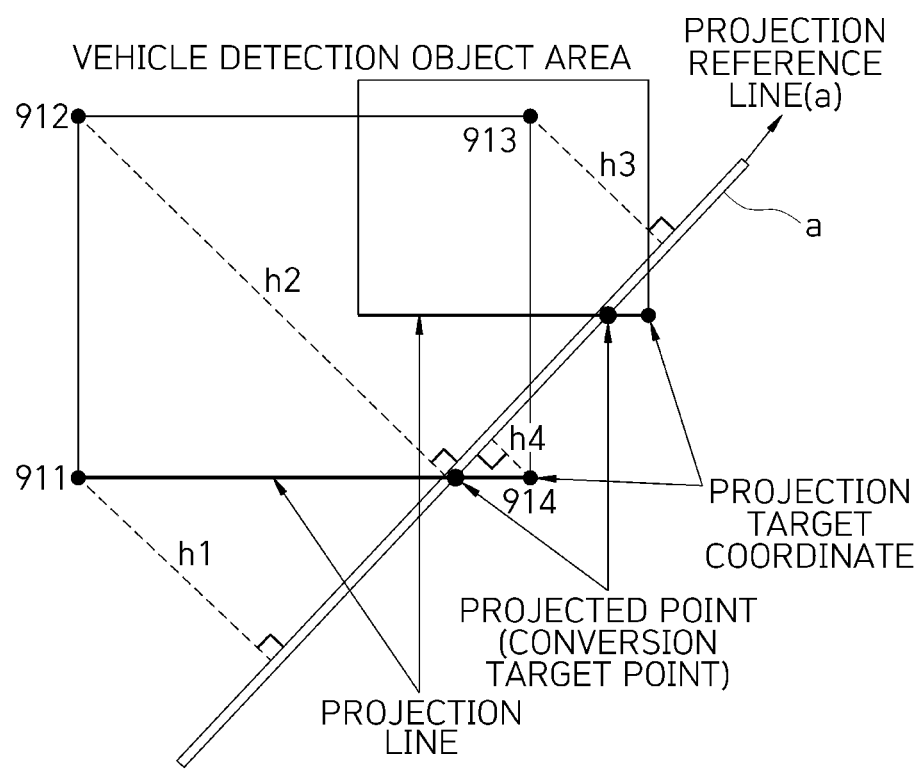
FIG. 9 is a diagram for describing selection of conversion target coordinates in an embodiment of the present invention.
Figure 10:
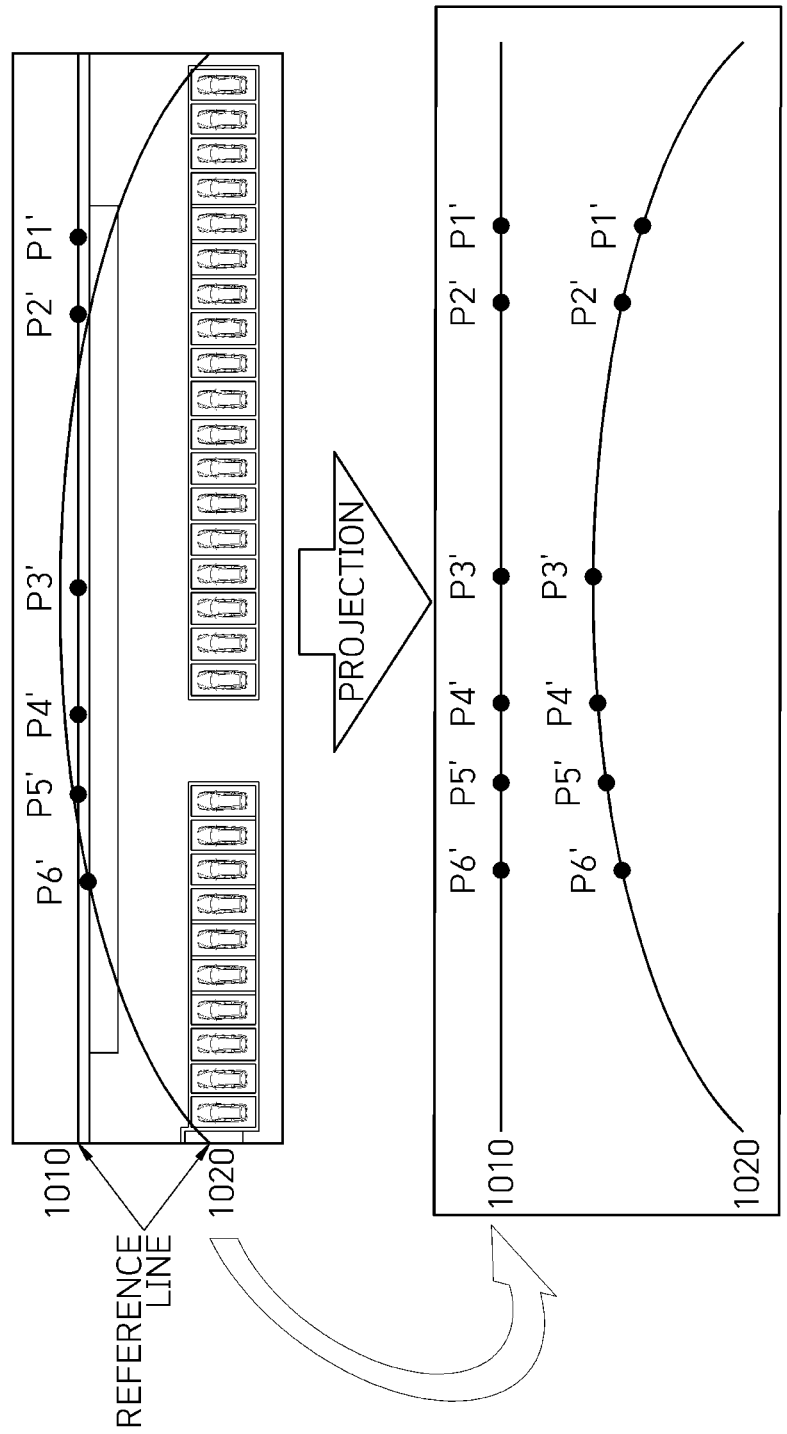
FIG. 10 is a diagram illustrating an example of projection according to a reference line in an embodiment of the present invention.

FIG. 8A is a diagram illustrating a parked vehicle detected in an image during parallel parking, and FIG. 8B is a diagram illustrating FIG. 8A as an actual location point on a map. FIG. 9 is a diagram for describing selection of conversion target coordinates in an embodiment of the present invention. FIG. 10 is a diagram illustrating an example of projection according to a reference line in an embodiment of the present invention.

In an embodiment of the present invention, the real distance may be calculated based on the coordinates and length conversion parameters of the object area that may be acquired when detecting a parked vehicle object.

First, as illustrated in FIG. 8A, when parked vehicles are detected using an object detection algorithm such as You Only Look Once (YOLO) and region-based convolutional neural networks (RCNN), the real distance information extraction unit 420 may obtain a rectangular bounding box object area (bounding box, 810) surrounding the parked car object in the image.

Next, the real distance information extraction unit 420 may select the same point of each detected parked vehicles, for example, points P1 to P6 close to a shoulder, and convert them positions P1' to P6' as illustrated in FIG. 8B (820).

Thereafter, the real distance information extraction unit 420 projects the coordinate information included in the object area information onto the reference line, and after this process is performed, may calculate and provide parking availability information for parallel parking, that is, occupancy information of parked vehicles and parking availability section information through the parking availability information management unit 430.

Meanwhile, in an embodiment of the present invention, in order to set the reference line, the vehicle object detection unit 410 may detect a division line of a predetermined shape that can distinguish between a roadway and a shoulder or a roadway and a sidewalk, and set the detected division line as the reference line. Here, the division line may include lines that can distinguish the roadway and sidewalk, such as a road edge zone line and a curb.

Referring to FIG. 9, in an embodiment, the real distance information extraction unit 420 may calculate vertical distances h1 to h4 from a reference line a for each of a plurality of coordinates 911 to 914 included in the object area information, and select the coordinate point 914 having the shortest vertical distance h4 among the calculated vertical distances as the projection target coordinates.

In this case, the point to be actually projected, that is, the conversion target coordinates, becomes a point where a line $\overline{P_4 P_1}$ composed of the point 911 in the object area information that has the same direction as the direction vector in the projection target coordinates and the preset reference line intersects the reference line.

Referring to FIG. 10, when the conversion target coordinates are selected in this way, the real distance information extraction unit 420 projects the conversion target coordinates of the parking availability information generation unit 431 onto the reference line a. When detecting parked vehicles, as illustrated in FIG. 10, more accurate parking occupancy information and distances between the parked vehicles may be calculated through the projection onto the reference line in consideration of the size of the object or the parking position deviation (deviation such as not parking exactly in a row). In this case, since the parallel parking lot may exist not only in a straight road shape (1010) but also in a curved road shape (1020), considering the projection stage is advantageous in responding to various road shapes.

Figure 11:
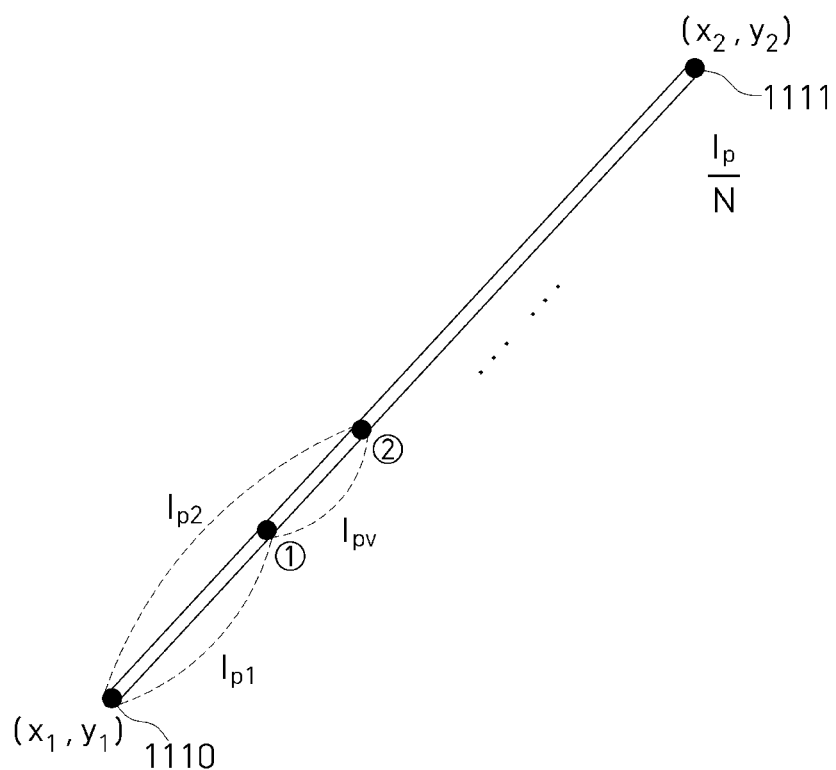
FIG. 11 is a diagram for describing a process of calculating a real distance between pixel points in an image in one embodiment of the present invention.

FIG. 11 is a diagram for describing a process of calculating a real distance between pixel points in an image in one embodiment of the present invention.

In addition, in an embodiment of the present invention, when the conversion target coordinates are selected, the distance between the conversion target coordinates may be calculated by applying the process of calculating the length conversion parameter. Assuming that the real distance between two points 1110 and 1111 in the image in FIG. 11 is calculated.

In this case, the distance between two points 1110 and 1111 in the image is $$l_{p_v} = l_{p_2} - l_{p_1},$$

and the real distance for this is $$= l_{R_v} = l_{R_2} - l_{R_1}.$$

According to Equation 2, the actual distance $l_{R_p}$ may be calculated as Equation 3.

$$l_{R_v} = \frac{l_{p_2}}{N_2}\alpha\left(\frac{\alpha^{N_2}-1}{\alpha-1}\right) - \frac{l_{p_1}}{N_1}\alpha\left(\frac{\alpha^{N_1}-1}{\alpha-1}\right) \quad \text{[Equation 3]}$$

Next, in an embodiment of the present invention, the parking availability information management unit 430 includes a parking availability information generation unit 431 and a parking availability information provision unit 432.

The parking availability information generation unit 431 may generate parking availability information of the parking target vehicle based on real distance information, and receive vehicle specification information from the external server 440, if necessary. That is, the parking availability information generation unit 431 may detect the parking availability section by determining the degree of occupancy of parked vehicles based on the real distance information and the vehicle specification information and calculating the separation distance between the parked vehicles. In this case, the vehicle specification information used is mainly about the vehicle size and may be acquired by calling the external server 440 with the vehicle number in API format.

Meanwhile, according to an embodiment of the present invention, when, among the vehicle specification information, the size information may not be secured, the previously calculated average vehicle size may be applied. Alternatively, the vehicle size information may be calculated using the object area information, that is, the size information of the bounding box. For example, when it is impossible to acquire the vehicle size information for the first vehicle, it is possible to calculate the vehicle size information of the first vehicle by comparing the size of the object area information of the second vehicle and the size of the object area information for the first vehicle from the vehicle size information.

The parking availability information provision unit 432 may collect vehicle information such as vehicle numbers from parked vehicles and generate the parking availability information such as parking availability section and the occupancy information of the parked vehicles to the user. In this case, a vehicle number may be extracted by using one registered in advance by the user through the application or by directly recognizing a license plate through a camera installed in a parking lot.

Figure 12:
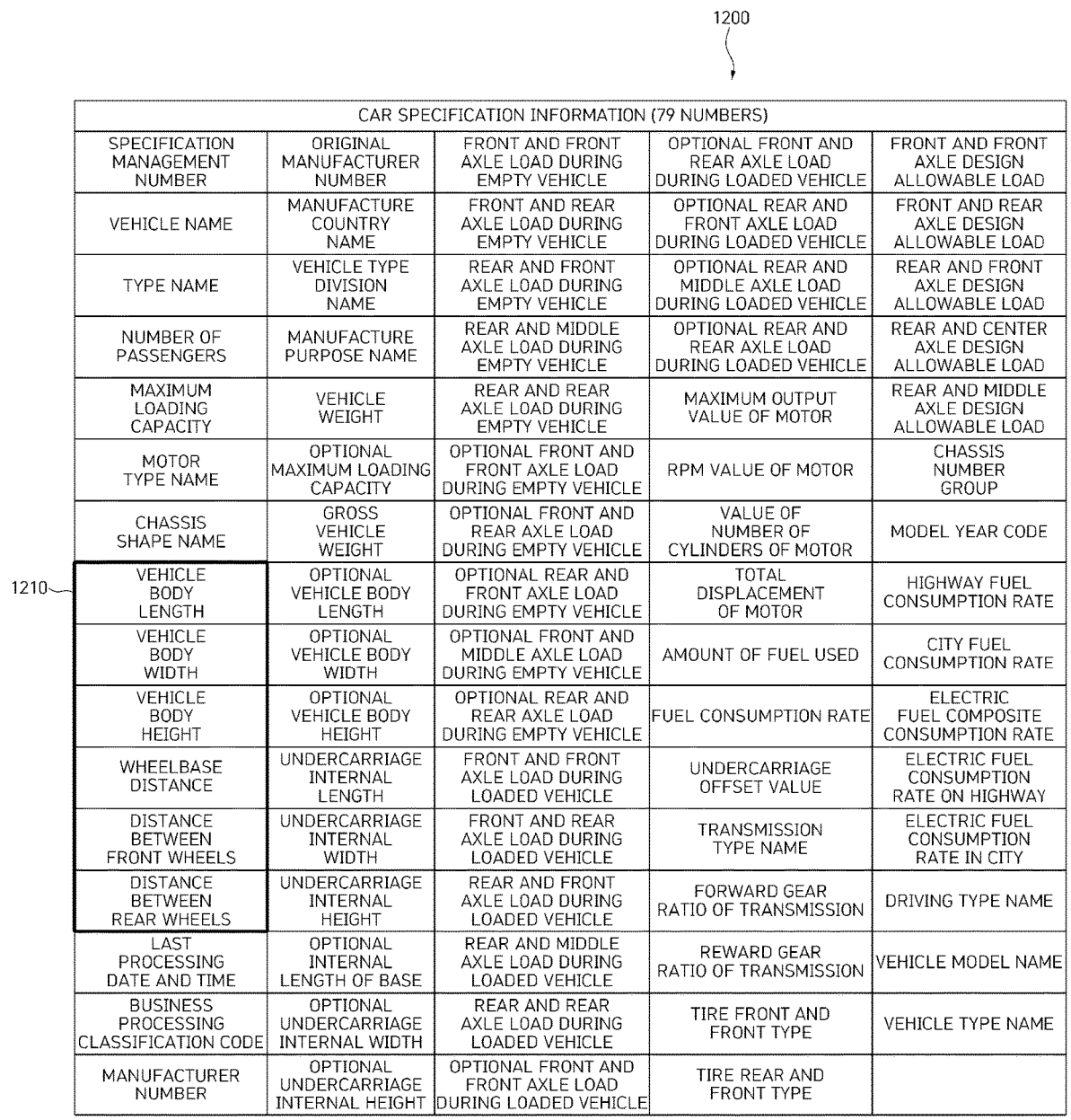
FIG. 12 is a diagram for describing an example of receiving vehicle specification information in an embodiment of the present invention.

FIG. 12 is a diagram for describing an example of receiving vehicle specification information in an embodiment of the present invention.

After the conversion target coordinates are projected onto the reference line, the parking availability information generation unit 431 requires size information 1210 of the parking target vehicle to accurately calculate the parking occupancy and the distance between the parked vehicles using the conversion target coordinates. Therefore, as illustrated in FIG. 12, the parking availability information generation unit 431 requests vehicle specification information 1200 (mainly vehicle size information) from the external server 440 that provides the vehicle specification information 1200 in an API form, and receives the requested vehicle specification information 1200. In this case, the vehicle number of the parking target vehicle may be one registered directly by a user through a parking app service, or can be acquired by various methods such as receiving a vehicle number from a vehicle capable of vehicle communication such as V2X or V2I, or directly extracting a vehicle number by recognizing a license plate from an image captured by a camera.

Figure 13:
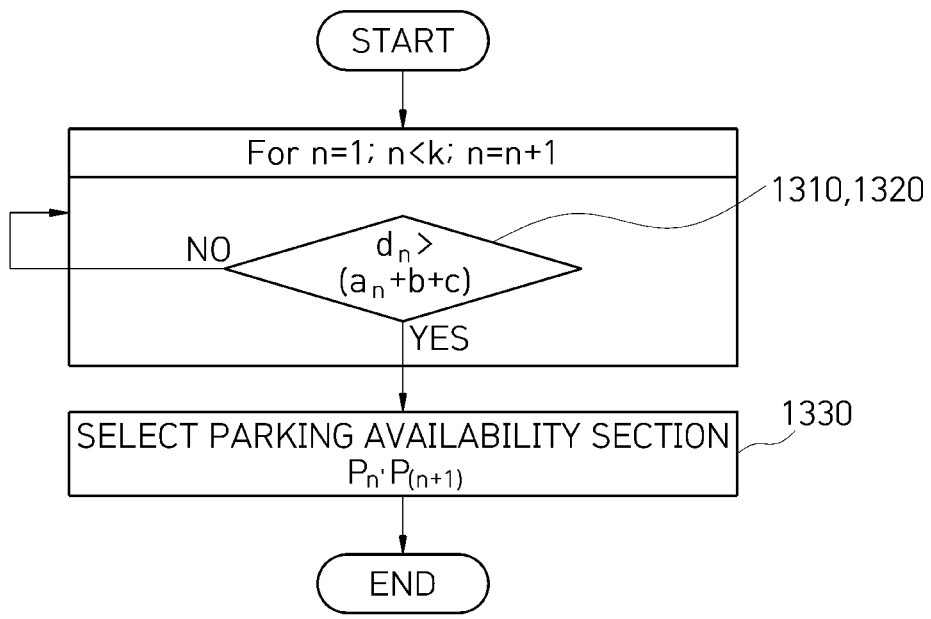
FIG. 13 is a diagram for describing a process of calculating parking availability information during parallel parking in an embodiment of the present invention.

FIG. 13 is a diagram for describing a process of calculating parking availability information during parallel parking in an embodiment of the present invention.

The parking availability information generation unit 431 may calculate the parking availability information based on the acquired size information of the parking target vehicle and the distance values of the projected coordinates.

In an embodiment, the parking availability information generation unit 431 sums the size information of the parked vehicle, the size information of the parking target vehicle, and a predetermined allowance distance required when parking the vehicle (1310), and compares the summed value with distances between neighboring coordinates among the projected coordinates, respectively (1320). In addition, the parking availability information generation unit 431 may calculate a section between neighboring coordinates having a distance greater than the summed value as a result of the comparison as a parking availability section (1330). The above comparison step is repeated as many times as the number of projection target coordinates.

In another embodiment, the parking availability information generation unit 431 calculates the distances between neighboring coordinates among the projected coordinates, respectively, and subtracts the size of the parked vehicle included in the distance between the neighboring coordinates. Next, the parking availability information generation unit 431 may calculate the occupancy information of the parked vehicle including the information on the number of parking availability vehicles in consideration of the summed value of the subtracted result value, the size information of the parking target vehicle, and the predetermined allowance distance required when parking the vehicle. This may be expressed as the following Equation 4.

$$\text{Information on number of parking availability vehicles} = \text{floor}\left(\frac{d(p_n, p_{n+1}) - a_n}{(b+c)}\right) \quad \text{[Equation 4]}$$

Meanwhile, in FIG. 13 and Equation 4, $d_n$ denotes a distance between an nth projection target coordinates, which refers to the distance between the projection target coordinates $p_n$ and $p_{n+1}$ coordinate. $a_n$ denotes the size information of the nth parked vehicle, b denotes the size information of the parking target vehicle, and c denotes the predetermined allowance distance required when parking the vehicle. In addition, k denotes the number of projection target coordinates.

For example, in FIG. 13, assuming that the size information $a_n$, b of all vehicles is 4 m, the predetermined allowance distance c required when parking the vehicle is set to 0.5 m, and the distance between the projection target coordinates $p_1$ and $p_2$ when n=1 is 5 m, and a distance between projection target coordinates $p_2$ and $p_3$ when n=2 is 15 m, the parking availability section should be at least 8.5 m or more, so section $d_2$ may be detected as the parking availability section. In addition, the number of parking availability vehicles in the section $d_2$ may be calculated as 2 vehicles. $d_2$ When the information that two vehicles can be parked in a section is transmitted to the parking vehicle, the user may check the location and size information for each parking availability section. In addition, of course, it is possible to provide the entire parking section and information on the total number of parking availability vehicles by summing the individual parking availability section and the information on the number of individual parking availability vehicles.

Figure 14:
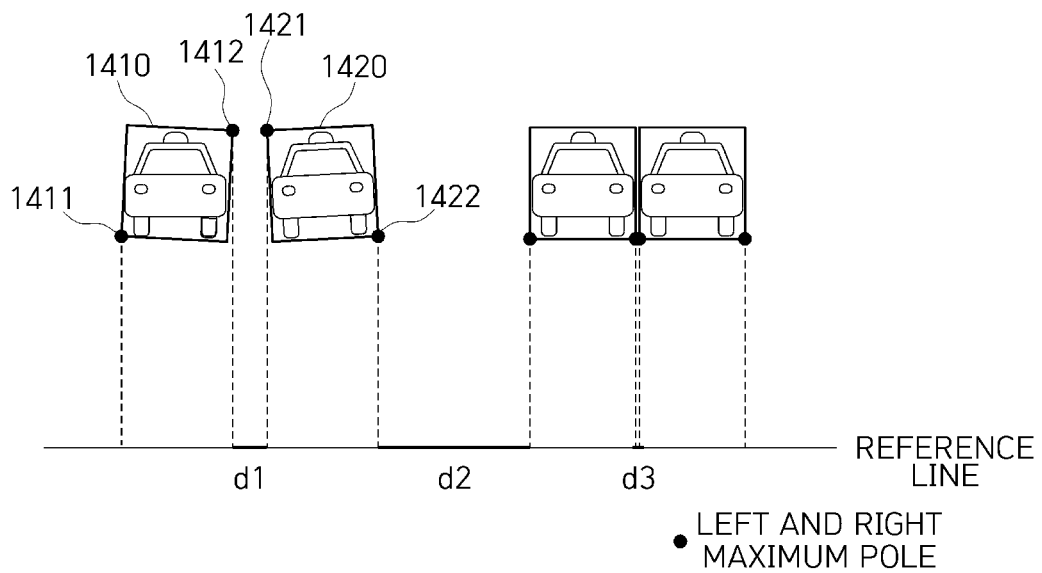
FIG. 14 is a diagram for describing real distance information conversion during perpendicular parking in an embodiment of the present invention.
Figure 15:
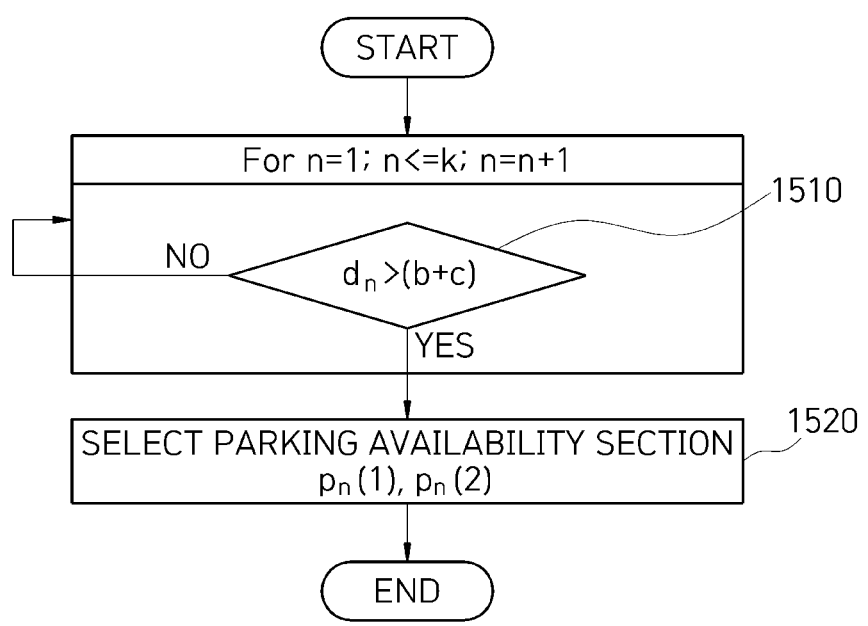
FIG. 15 is a diagram for describing a process of calculating parking availability information during perpendicular parking in an embodiment of the present invention.

FIG. 14 is a diagram for describing real distance information conversion during perpendicular parking in an embodiment of the present invention. FIG. 15 is a diagram for describing a process of calculating parking availability information during perpendicular parking in an embodiment of the present invention.

The perpendicular parking case follows mostly similar procedures to the parallel parking case, except that left and right maximum poles 1411, 1412, 1421, 1422, . . . , are selected as conversion target coordinates from the object area information 1410, 1420, . . . , acquired when detecting the parked vehicle. That is, the real distance information extraction unit 420 may select each of the left and right maximum poles among the plurality of coordinates included in the object area information as the conversion target coordinates.

In the case of the perpendicular parking case, the separation distances d1, d2, and d3 between the parked vehicles may be directly calculated without the information on the size of the parked vehicle, and the parking availability section can also be calculated using just the sum of the size of the parking target vehicle and the allowance distance.

The parking availability information generation unit 431 sums the size information of the parking target vehicle and the predetermined allowance distance required when parking the vehicle, and calculates the distance between other parked vehicles and neighboring coordinates among the projected coordinates as the real distance information. In this case, the real distance information may be calculated using Equation 3 described above. In addition, the parking availability information generation unit 431 detects a section between neighboring coordinates having a distance greater than the summed value as a result of the comparison as the parking availability section (1510 and 1520). The above comparison step can be repeated as many times as the separation distance between the parked vehicles.

In another embodiment, the parking availability information generation unit 431 may calculate the distance between other parked vehicles and neighboring coordinates among the projected coordinates as the real distance information, and calculate the information on the number of parking availability vehicles in consideration of the summed value of the distance between neighboring coordinates, the size information of the parking target vehicle, and the predetermined allowance distance required when parking the vehicle. This may be expressed as the following Equation 5.

$$\text{Information on number of parking availability vehicles} = \text{floor}\left(\frac{d(p_n(1), p_n(2))}{(b+c)}\right) \quad \text{[Equation 5]}$$

Meanwhile, in FIG. 15 and Equation 5, $d_n$ denotes the nth inter-vehicle distance. $p_n(1)$ denotes a first coordinate value that constitutes the inter-vehicle distance, and $p_n(2)$ denotes a second coordinate value that constitutes the inter-vehicle distance. For example, in the case of the inter-vehicle distance $d_1$ in FIG. 14, $p_n(1)$ denotes a coordinate value of an upper right corner of the left vehicle, and $p_n(2)$ denotes a coordinate value of an upper left corner of the right vehicle. b denotes the information on the size of the parking target vehicle, and c denotes a certain clearance distance required when parking the vehicle. In addition, k denotes the number of projection target coordinates.

Among the parking availability information generated in an embodiment of the present invention, the information on the number of parking availability vehicles included in the occupancy information of the parked vehicle varies and is provided in real time depending on the parking status of the vehicle, and may be updated each time the vehicle is parked or taken out. In this case, the parking availability information extraction unit may calculate an initial parking availability vehicle from the entire area constituting the parking lot and provide the calculated initial parking availability vehicle to the user or manager.

In another embodiment, according to the present invention, the projection is performed by selecting projection target coordinates using a predetermined reference line. In this case, the above-described reference line has been described assuming one straight line or curve, but is not necessarily limited thereto.

For example, when a straight section and a curved section are included within a predetermined distance, they may be set by dividing them into a plurality of reference lines. That is, the straight section may be set as the first reference line, the next curved section may be set as the second reference line, and the next straight section may be set as the third reference line. In this case, the reference line may be set through the line detection method in the vehicle object detection unit 410 that processes the image captured by the camera, but is not necessarily limited thereto.

As a plurality of reference lines are set within one parking lot (parking space), the parking availability information generation unit 431 may calculate the parking availability information for each reference line. In this case, the effect of being able to calculate and provide information more quickly can be expected compared to generating parking availability information targeting a single long reference line.

In this case, when there is a parked vehicle between the first reference line and the second reference line, or when there is no parking availability section within the first reference line or the second reference line, but a parking availability area may be generated when determination by combining the first and second reference lines, the parking availability information extraction unit may operate by integrating the first and second reference lines.

Meanwhile, according to an embodiment of the present invention, it is possible to guide the optimal parking availability section in addition to the above-described structure. For example, when a plurality of parking availability sections are confirmed, the parking availability section closest to the parking target vehicle may be guided.

In this case, in the case of the parallel parking, in the state in which two or more vehicles can be parked in one parking availability section, when the parking target vehicle parks incorrectly, such as near the middle point of the section, problems may occur where other vehicles may not be parked additionally.

To this end, the parking availability information management unit 430 may guide the parking target vehicle to satisfy the gap between the front or rear parked vehicles constituting the corresponding section and the interval of the preset allowance distance.

Alternatively, the parking availability information generation unit 431 may calculate the maximum possible allowance distance from the front or rear parked vehicle constituting the corresponding section, and when the maximum possible allowance distance is exceeded, parking to the parking target vehicle is performed incorrectly, and it may guide parking to satisfy the interval of the preset allowance distance.

In this case, the parking availability information generation unit 431 may calculate interval information between each of the first and second vehicles and the current parking target vehicle based on a starting point of the first vehicle and a starting point of the second vehicle acquired from the projection target coordinates, and the coordinates and size information of the current parking target vehicle, and calculate the maximum possible allowance distance in the form that the remainder obtained after subtracting the size information of the current parking target vehicle, the size information of the expected parking target vehicle, and the preset allowance distance from the summed value of the plurality of interval information is summed with the preset allowance distance.

By applying the maximum possible allowance distance, it is possible to enable parking of other parking target vehicles while leaving a wider gap between the parking target vehicle and the front or rear parked vehicle, rather than the preset allowance distance (minimum allowance distance) of the corresponding parking target vehicle.

Meanwhile, information of the expected parking target vehicle may be acquired by communicating the size information of the parking availability vehicle with the external server 440 in consideration of the summed value of the plurality of interval information, the size information of the current parking target vehicle, and the preset allowance distance.

Hereinafter, a method performed by the system for generating parking availability information according to an embodiment of the present invention will be described with reference to FIG. 16.

Figure 16:
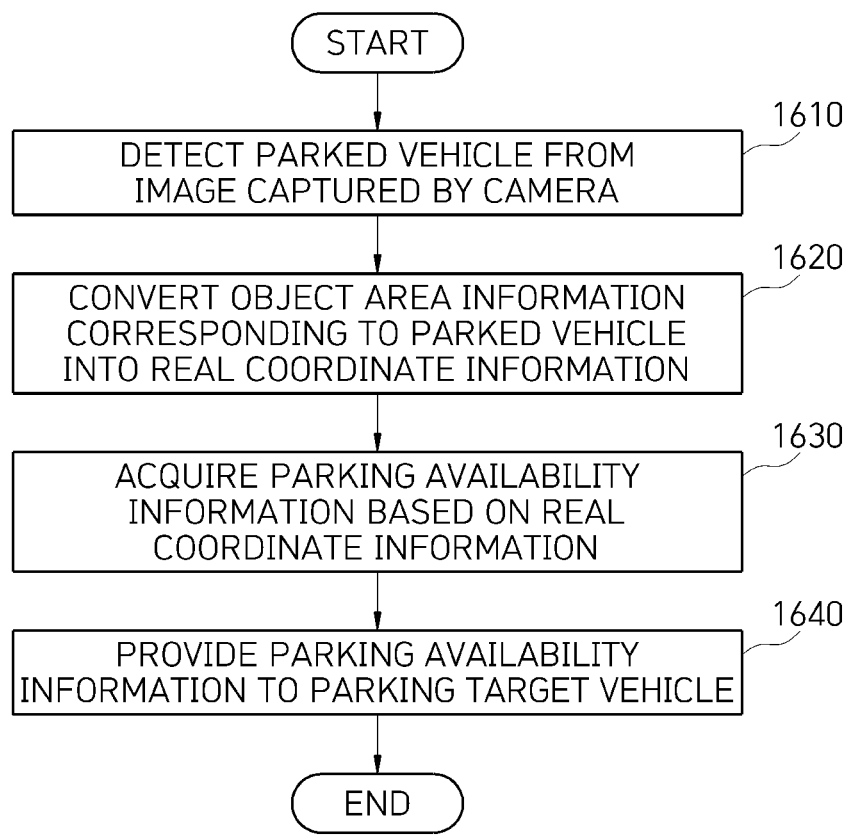
FIG. 16 is a flowchart of a method of generating parking availability information according to an embodiment of the present invention.

FIG. 16 is a flowchart of a method of generating parking availability information according to an embodiment of the present invention.

First, at least one already parked vehicle is detected from the image captured by the camera (1610).

Next, the object area information corresponding to the detected parked vehicle is converted into location information (real distance information) based on the real coordinate system (1620).

Next, the parking availability information of the parking target vehicle is generated based on the real distance information (1630), and the parking availability information is provided to the parking target vehicle (1640).

In this case, the parking availability information may include the parking availability section based on the occupancy information of the parked vehicle and the distance between parked vehicles from real distance information set for a predetermined reference line.

Meanwhile, in the above description, steps S1610 to S1640 may be further divided into additional steps or combined into fewer steps according to an implementation example of the present invention. Also, some steps may be omitted if necessary, and an order between the steps may be changed. In addition, the contents of FIGS. 3 to 11 and the contents of FIG. 12 may be mutually applied.

The above-described embodiment of the present invention may be embodied as a program (or application) and stored in a medium for execution in combination with a computer which is hardware.

In order for the computer to read the program and execute the methods implemented as the program, the program may include a code coded in a computer language such as C, C++, JAVA, Ruby, or machine language that the processor (CPU) of the computer may read through a device interface of the computer. Such code may include functional code related to a function or such defining functions necessary for executing the methods and include an execution procedure related control code necessary for the processor of the computer to execute the functions according to a predetermined procedure. In addition, the code may further include a memory reference related code for which location (address street number) in an internal or external memory of the computer the additional information or media necessary for the processor of the computer to execute the functions is to be referenced at. In addition, when the processor of the computer needs to communicate with any other computers, servers, or the like located remotely in order to execute the above functions, the code may further include a communication-related code for how to communicate with any other computers, servers, or the like using the communication module of the computer, what information or media to transmit/receive during communication, and the like.

The storage medium is not a medium that stores images therein for a while, such as a register, a cache, a memory, or the like, but means a medium that semi-permanently stores the images therein and is readable by an apparatus. Specifically, examples of the storage medium include, but are not limited to, ROM, random-access memory (RAM), CD-ROM, a magnetic tape, a floppy disk, an optical image storage device, and the like. That is, the program may be stored in various recording media on various servers accessible by the computer or in various recording media on the computer of the user. In addition, media may be distributed in a computer system connected by a network, and a computer-readable code may be stored in a distributed manner.

The above description of the present invention is for illustrative purposes, and those skilled in the art to which the present invention pertains will understand that it may be easily modified to other specific forms without changing the technical spirit or essential features of the present invention. Therefore, it should be understood that the above-mentioned embodiments are exemplary in all aspects but are not limited thereto. For example, each component described as a single type may be implemented in a distributed manner, and similarly, components described as distributed may be implemented in a combined form.

According to an embodiment of the present invention described above, it is possible to detect a degree of parking occupancy and parking availability space detection regardless of the presence or absence of a parking line or a parking surface division line in both parallel parking and perpendicular parking environments, and thus, it is possible to provide not only whether vehicles can be parked and a parking availability location, but also information on the number of parking availability vehicles.

Accordingly, since the parking availability information may be received in advance even in other areas before a vehicle approaches a parking area, there is a cost and time advantage in reducing unnecessary vehicle driving that may occur while finding whether vehicles can be parked and a parking space when parking is available.

In addition, according to an embodiment of the present invention, it is possible to help clearly determine whether vehicles can be parked and a location where parking is available according to a size of a parking target vehicle by accurately calculating a separation distance between parked vehicles. In this process, actual measurements of the actual parking environment may be necessary, but it is possible to simplify a previous preparation process by minimizing a measurement reference point compared to existing methods.

In addition, an embodiment of the present invention has the advantage of simple infrastructure construction and easy maintenance because it does not require the construction of a separate sensor and uses only the minimum number of cameras.

The effects of the present invention are not limited to the above-described effects, and other effects that are not mentioned may be obviously understood by those skilled in the art from the following description.

It is to be understood that the scope of the present invention will be defined by the claims rather than the above-described description and all modifications and alternations derived from the claims and their equivalents are included in the scope of the present invention.

What is claimed is:

1. A method of generating parking availability information performed by a computer, the method comprising:
   collecting actual measurement data corresponding to a reference point of a parking availability section based on a distance between parked vehicles from an image captured by a camera;
   setting a reference line within a region of interest set from the image captured by the camera;
   detecting at least one already parked vehicle from the image captured by the camera;
   converting object area information corresponding to the detected at least one parked vehicle into real distance information;
   calculating a length conversion parameter for converting a distance between parked vehicles into the real distance information; and
   generating parking availability information that includes occupancy information of parked vehicles, of a parking target vehicle based on the real distance information,
   wherein in the generating of the parking availability information of the parking target vehicle, the parking availability information that includes occupancy information of parked vehicles and the parking availability section based on the distance between the parked vehicles is generated from the real distance information set for the reference line,
   wherein the converting of the object area information into the real distance information includes converting the object area information into the real distance information based on initially collected actual measurement data and a length conversion parameter,
   wherein the calculating of the length conversion parameter for converting the distance between the parked vehicles into the real distance information includes:
   calculating an inter-pixel Euclidean distance between two points corresponding to the actual measurement data in the image captured by the camera;
   converting the calculated inter-pixel Euclidean distance so that a distance for each pixel between the two points increases proportionally by the length conversion parameter in a direction of a farthest point among the two points; and
   calculating the length conversion parameter based on an actual length between the two points included in the actual measurement data and a conversion result.

2. The method of claim 1, wherein the setting of the reference line within the region of interest set from the image captured by the camera includes:
   detecting a division line of a certain shape that divides between a roadway and a shoulder or a roadway and a sidewalk; and
   setting the detected division line as the reference line.

3. The method of claim 1, wherein the converting of the object area information into the real distance information includes projecting coordinate information included in the object area information onto the reference line, and
   the generating of the parking availability information of the parking target vehicle includes:
   calculating size information of the parking target vehicle; and
   calculating the parking availability information based on the size information of the parking target vehicle and distance values of the projected coordinates.

4. The method of claim 3, wherein the projecting of the coordinate information included in the object area information onto the reference line includes:
   calculating a vertical distance from a reference line for each of a plurality of coordinates included in the object area information;
   selecting coordinate points having a shortest vertical distance among the calculated vertical distances as a projection target coordinate;
   extracting a point within the object area information in a same direction as a direction vector formed by the projection target coordinate and the reference line; and
   selecting an intersection point between an extension line that is composed of a point within the extracted point within the object area information and the projection target coordinate and the reference line as conversion target coordinates to be finally projected.

5. The method of claim 4, wherein the calculating of the parking availability information based on the size information of the parking target vehicle and the distance values of the projected coordinates includes:
   summing size information of the parked vehicle, the size information of the parking target vehicle, and a predetermined allowance distance required when parking the vehicle;
   comparing the summed size information with distances between neighboring coordinates among the projected coordinates, respectively; and
   detecting a section between the neighboring coordinates having a distance greater than the summed size information as a result of the comparing as the parking availability section.

6. The method of claim 4, wherein the calculating of the parking availability information based on the size information of the parking target vehicle and the distance values of the projected coordinates includes:
   calculating distances between neighboring coordinates among the projected coordinates;
   subtracting a size of the parked vehicle included in a distance between the neighboring coordinates; and
   calculating occupancy information of the parked vehicle, including information on a number of parking availability vehicles, in consideration of a summed value of a subtracted result value, the size information of the parking target vehicle, and a predetermined allowance distance required when parking the vehicle.

7. The method of claim 3, wherein the projecting of the coordinate information included in the object area information onto the reference line includes selecting left and right maximum poles in the object area information as conversion target coordinates, respectively.

8. The method of claim 7, wherein the calculating of the parking availability information based on the size information of the parking target vehicle and the distance values of the projected coordinates includes:
   summing the size information of the parking target vehicle and a predetermined allowance distance required when parking the vehicle;

calculating distances between other parked vehicles and neighboring coordinates among the projected coordinates; and detecting a section between the neighboring coordinates having a distance greater than a summed value of the distances as a result of the calculating the distances as the parking availability section.

9. The method of claim 7, wherein the calculating of the parking availability information based on the size information of the parking target vehicle and the distance values of the projected coordinates includes:

calculating distances between other parked vehicles and neighboring coordinates among the projected coordinates, respectively; and calculating occupancy information of the parked vehicle, including information on the a number of parking availability vehicles, in consideration of the a summed value of the distances between the neighboring coordinates, the size information of the parking target vehicle, and a predetermined allowance distance required when parking the vehicle.

10. A system for generating parking availability information, comprising:

a communication unit that transmits and receives data to and from an external server where vehicle specification information is stored and a vehicle, and receives an image captured by a camera;

a memory that stores a program for generating parking availability information including occupancy information of parked vehicles for a parking target vehicle from the image; and a processor that executes the program stored in the memory to collect actual measurement data corresponding to a reference point of a parking availability section based on a distance between the parked vehicles from the image captured by the camera, set a reference line within a region of interest set from the image captured by the camera, calculate a length conversion parameter for converting a distance between parked vehicles into real distance information, detect at least one already parked vehicle from the image, convert object area information corresponding to the detected at least one already parked vehicle into the real distance information, generate the parking availability information including occupancy information of parked vehicles and the parking availability section based on the distance between the parked vehicles from the real distance information set for the reference line, and then provide the parking availability information to the parking target vehicle through a communication module, wherein the converting of the object area information into the real distance information includes converting the object area information into the real distance information based on initially collected actual measurement data and the length conversion parameter, wherein the calculating of the length conversion parameter for converting the distance between the parked vehicles into the real distance information includes:

calculating an inter-pixel Euclidean distance between two points corresponding to the actual measurement data in the image captured by the camera;

converting the calculated inter-pixel Euclidean distance so that a distance for each pixel between two points increases proportionally by the length conversion parameter in a direction of a farthest point among the two points; and calculating the length conversion parameter based on an actual length between the two points included in the actual measurement data and a conversion result.

* * * * *